INVENTOR.
HUNTER C. GOODRICH
BY
W. H. Sprouagle
Attorney

INVENTOR.
HUNTER C. GOODRICH
BY
W. H. Sprague
Attorney

United States Patent Office 3,302,033
Patented Jan. 31, 1967

3,302,033

PULSE FORMING CIRCUIT FOR HORIZONTAL DEFLECTION OUTPUT TRANSISTOR

Hunter C. Goodrich, Collingswood, N.J., assignor to Radio Corporation of America, a corporation of Delaware Filed Dec. 19, 1962, Ser. No. 245,753
5 Claims. (Cl. 307—88.5)

The present invention relates to pulse forming circuits for television receivers. More particularly the present invention relates to horizontal deflection circuit arrangements for a transistorized television receiver.

Electromagnetic deflection circuits in cathode ray tubes require large amplitude, substantially sawtooth shaped current waves for application to the horizontal and vertical deflecting coils. For transistorized television receivers wide angle cathode ray tubes are desirable so as to keep the depth of the receiver as small as possible. The deflection of the electron beam through the wider angle requires that the deflection coils be supplied with even larger amplitude currents than heretofore for narrower angle deflection systems. However, this puts an additional burden on the output transistors used in the television receiver.

To generate the sawtooth shape, the transistor is varied between its saturated condition when maximum forward current flows and cut off condition wherein no forward current flows. Since the transistor is a bi-directional device it is possible for reverse current to flow therethrough during certain biasing conditions. Heavy reverse current can cause an undesirable amount of heat generation due to the reverse current power dissipation. This can ruin the operating characteristics of the transistor.

Accordingly, it is an object of the present invention to provide a new and improved cathode ray tube deflection circuit for a transistorized television receiver.

A second object of the present invention is to provide a new and improved transistorized horizontal deflection circuit for a television receiver wherein undesirable biasing conditions for the transistor are substantially eliminated.

With the above objects in view the present invention is illustratively embodied in a deflection circuit for a television receiver having a blocking oscillator transistor and an output transistor, each of said transistors having base, emitter and collector electrodes. The blocking oscillator transistor provides output pulses which are applied to the output transistor to alternately render the output transistor conductive and nonconductive. One electrode of the output transistor is connected to the deflecting coils of the television receiver and pulse shaping means are included in series with one of the electrodes of one of the transistors for shaping the pulses applied to the output transistor so that the amplitude of the leading edge of the shaped pulse is substantially higher than that necessary to cut off the output transistor and the trailing edge of the shaped pulse is substantially lower than the amplitude of its leading edge while still being higher than necessary to maintain the output transistor in cut-off condition.

The novel features which are considered as characteristic for the invention are set forth in particular in the appended claims. The invention itself, however, both as to its construction and its method of operation together with additional objects and advantages thereof will best be understood from the following description of specific embodiments when read in connection with the accompanying drawings in which:

Figure 1:
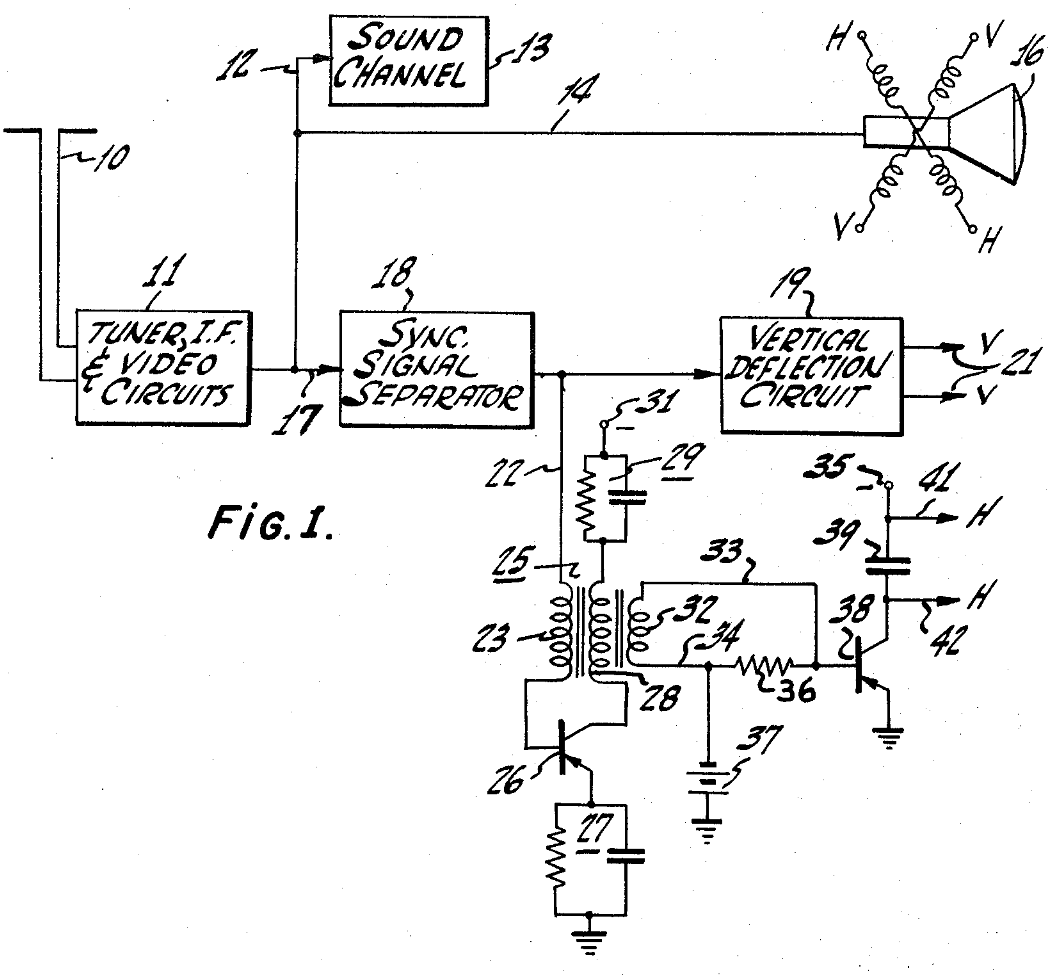
FIGURE 1 is a schematic diagram partially in block form of a television receiver illustrating a horizontal output circuit arrangement constructed in accordance with the principles of the present invention.

Referring to the drawings and more particularly to FIGURE 1, television signals transmitted from a broadcasting station are picked up by the antenna 10 of the television receiver and applied to the radio frequency (RF) tuner. The block 11 represents the RF tuner, intermediate frequency (IF) amplifier, and video circuits of the television receiver. The operation of the circuits represented by the block 11 are not essential for the understanding of the principles of the present invention and accordingly details thereof are not illustrated in order to avoid unnecessarily complicating the drawing.

The apparatus represented by the block 11 demodulates the received television signal and applies the same on conductor 12 to a sound channel 13; on conductor 14 to a cathode ray tube 16 and on conductor 17 to a synchronizing signal separator 18. The sound channel represented by the block 13 reproduces the audio information contained in the signal in synchronism with the displayed video signal.

The cathode ray tube 16 reproduces the image represented by the television video signal and the synchronizing signal separator separates the vertical and horizontal synchronizing signals which are present in the received television signal. The vertical synchronizing signal is applied from the sync separator 18 to the vertical deflection circuit 19 and synchronizes the generation of generally sawtooth shaped pulses which are produced at the output terminals 21 of the circuit 19 and applied to the vertical deflection coils V—V of the cathode ray tube 16.

The sound channel, synchronizing signal separator and vertical deflection circuits may each be constructed in any one of several conventional configurations to carry out its respective function. Again, complete details of these circuits are not illustrated in order to avoid unnecessarily complicating the drawings.

Figure 2:
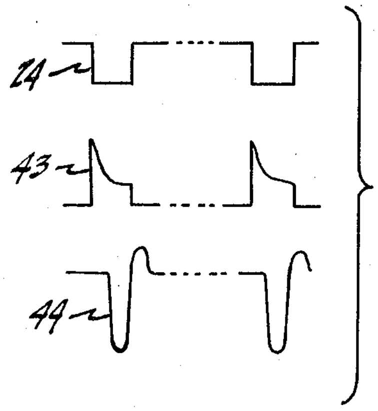
FIGURE 2 is a graphical representation of the current waveforms appearing at different points of the circuit of FIGURE 1.

The horizontal synchronizing signals are applied on a conductor 22 to a winding 23 of a blocking oscillator transformer 25. These horizontal synchronizing pulses have a generally square wave configuration as indicated in FIGURE 2, waveform 24.

In FIGURE 1 the primary winding 23 is shown connected in series with the base electrode of a blocking oscillator transistor 26. Transistor 26 is illustrated as a PNP transistor having its emitter electrode connected to ground potential by means of a frequency determining parallel resistor-capacitor network 27.

The collector electrode of the transistor 26 is connected by means of a second winding 28 of transformer 25 and a parallel resistor-capacitor network 29 to the negative terminal 31 of a source of operating potential (not illustrated) which has its positive terminal grounded.

In addition, the transformer 25 has a third winding 32 which is connected by means of conductors 33 and 34 to opposite ends of a resistor 36. One side of resistor 36 is connected to one terminal of a bias battery 37, the other terminal of which is connected to ground potential. The other side of resistor 36 is connected to the base electrode of the output transistor 38, the emitter electrode of which is connected directly to ground potential. The collector electrode of the transistor 38 (shown as a PNP type) is connected to the negative terminal 35 of the operating potential source for the television receiver by means of a capacitor 39. The terminals of the capacitor are connected by conductors 41 and 42 directly across the horizontal deflecting coils H—H of the cathode ray tube 16.

The sawtooth shaped currents for the horizontal deflection coils H—H are produced by the alternate conduction and non-conduction of the output transistor 38. This transistor is operated as a switch. During the trace portion of the horizontal deflection cycle the negative terminal of the source of operating potential and the negative portion of the pulses applied to the base of the transistor 38 forward biases the transistor and causes current to flow through the collector-emitter circuit by way of the horizontal deflection coils H—H. The current through the coils will increase in a linear manner with time until a pulse of positive polarity is applied to the base of the transistor 38 from the blocking oscillator transistor 26. This will cut off current in the emitter-collector circuit of the transistor 38 so that the energy stored in the horizontal deflection coils H—H will discharge through the capacitor 39 in a half-wave oscillatory manner during the retrace portion of the horizontal deflection cycle.

When the positive pulse applied to the transistor 38 is terminated the forward bias conditions will be restored on this transistor to close the circuit which includes the transistor and the deflection windings H—H. The operating cycle is then repeated.

Accordingly, the deflection arrangement including the transistor 38 generates a sawtooth current wave for horizontally deflecting the electron beam of the cathode ray tube 16. The operating cycle just described refers to substantially the last half of the horizontal scan cycle and the retrace interval. In accordance with reaction scanning principles, the first half of the reaction scanning cycle occurs during conduction of the damper diode which has not been illustrated, since for the purposes of this application, it operates in its usual manner.

As pointed out above the transistor 38 acts as a switch. The sudden collapse of the magnetic field about the horizontal deflection windings during the retrace portion of the deflection cycle produces undesirable reverse high voltage conditions on transistor 38. The combination of the positive cut-off potential on the base electrode of the transistor 38 and the high voltage negative fly back pulse produced during this retrace interval can cause a breakdown of the base emitter diode of transistor 38 in the reverse direction. This in turn causes a channeling effect of current between the collector and emitter electrodes, thus producing undesired power dissipation and local heating in the transistor to affect adversely its operating characteristics.

The arrangement of the blocking oscillator transistor 26 and the output transistor 38 of FIGURE 1 operates to reduce substantially the undesirable reverse bias conditions present on the transistor 38 during the retrace interval.

In operation, the negative pulses 24 applied from the sync separator 18 to the base electrode of transistor 26 initiates conduction in this transistor. Collector current in transistor 26 starts to flow upon the application of the leading edge of the waveform 24, substantially all of the current initially flowing through the capacitor of the parallel combination 29. As the capacitor becomes charged by the current flow most of the collector current flows through the resistor of the parallel combination 29. The resulting wave shape produced in the winding 32 is illustrated by the waveform 43 of FIGURE 2. It can be seen that the leading edge of the waveform 43 is substantially higher in amplitude than the remaining portion thereof. This is due to the fact that the impedance of the capacitor in the parallel network 29 during the rise time of the pulse 24 is substantially lower than the resistance of this network.

The waveform 43 applied by means of the winding 32 to the base electrode of the output transistor 38 cuts this transistor off. The bias source 37 and the circuit constants are chosen so that the large initial amplitude of the leading edge of the waveform 43 is substantially higher than the potential necessary to cut off the transistor 38. The remainder of the waveform 43 including its trailing edge is lower in amplitude but is still sufficiently large to maintain transistor 38 in nonconductive condition.

This arrangement achieves the advantage of very rapid turn off of the transistor 38. The carriers must be swept out from the base of the transistor in order to cut the transistor off. The higher the amplitude of the positive cut off pulse, the quicker the carriers will be swept out from the base. This produces the sharp decrease in the collector current of the transistor 38, corresponding to the retrace portion of the sawtooth waveform. The shape of the collector current will be discussed further with respect to the second embodiment of the present invention.

Thus it is seen that the transistor 38 is rapidly turned off by the high amplitude leading edge of the waveform 43 and maintained in cut off condition at the substantially lower potential. The flyback pulse produced by the collapse of the magnetic field about the horizontal coils H—H does not develop until the collector current has substantially reached zero. It can be seen from FIGURE 2 that the flyback pulse, which is the large negative pulse of the waveform 44, does not occur until after the lower potential of the waveform 43 is reached. As pointed out above, this pulse corresponds to the half wave oscillatory discharge through capacitor 39.

Accordingly, the possibility of base emitter diode breakdown is kept to a minimum by having the high amplitude necessary for rapid turn off of the transistor 38 confined to a small portion of the pulse applied to the base of the transistor 38. The large flyback pulse does not appear until after the leading edge of the waveform 43. Therefore, the possibility of the channeling of a large amount of collector-emitter current is reduced to a minimum. It can be seen that, by utilizing the principles of the present invention, a large amount of power dissipation in the output transistor is avoided. This is particularly applicable when the output transistor has a relatively lower reverse breakdown voltage.

Figures 3, 4:
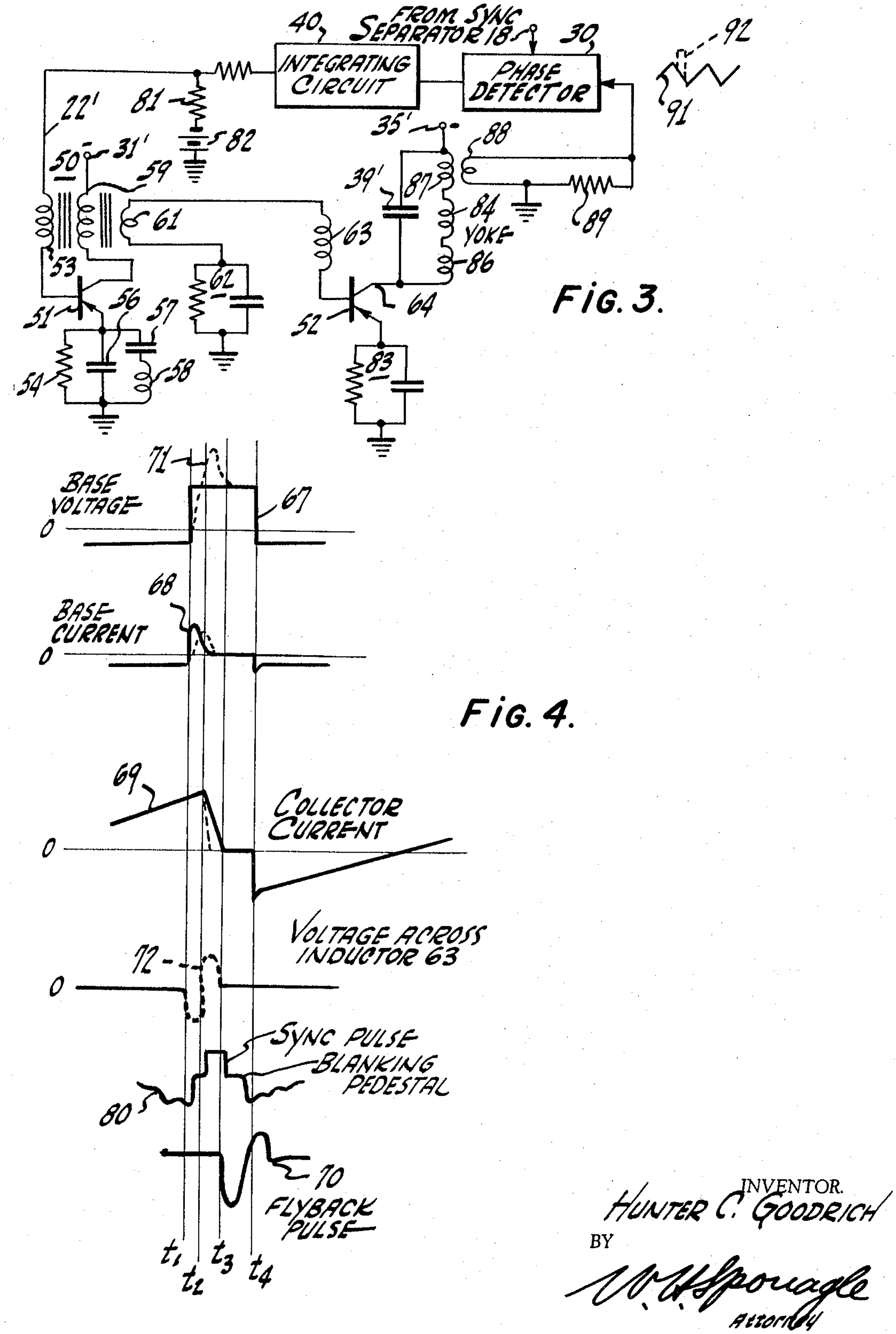
FIGURE 3 is a schematic diagram of a second embodiment of the present invention.
FIGURE 4 is a graphical representation of current waveforms appearing at different points of the circuit of FIGURE 3.

Referring now to FIGURE 3 a second embodiment of the present invention is illustrated. In this figure only that portion of the circuit connected to the synchronizing signal separator 18 is illustrated. The circuit may otherwise be the same as that shown in FIGURE 3. Also, in order to simplify the illustrated circuitry, it was assumed in the description of FIGURE 1 that the blocking oscillator was triggered directly by pulses derived from the sync separator 18. In actual practice the blocking oscillator may be triggered by signals derived from a phase detector and integrating circuit. The phase detector relates the current flowing through the horizontal deflecting coils to the synchronizing signal to be sure that the output of the blocking oscillator is properly phased.

In FIGURE 3 is shown the phase detector 30 connected to the input of an integrating circuit 40. The output from the integrating circuit 40 is connected by means of a conductor 22′ to a winding 53 of a transformer 50. The winding 53 is connected in series with the base of the blocking transistor 51. Operating bias for the base electrode of the transistor 51 is provided by the resistor 81 and direct current potential source 82 which are connected to the conductor 22′.

The emitter electrode of the transistor 51 is connected to ground by means of the parallel combination of a resistor 54, capacitor 56 and the series combination of a capacitor 57 and an inductor 58. This parallel combination determines the self-oscillation frequency of the blocking oscillator. The actual repetition rate is determined by the repetition rate of the synchronizing signals 24 (FIGURE 2).

Connected in series between the collector electrode of the transistor 51 and the negative terminal 31' of the source of direct current operating potential is a second winding 59 of the transformer 50. Coupled to this winding is the output winding 61 of the transformer 50 having one of its ends connected to ground potential by means of a parallel combination 62 of a resistor and capacitor. The other end of winding 61 is connected to the base electrode of an output transistor 52 by means of an inductor 63.

The emitter electrode of the transistor 52 is connected to ground by the parallel combination 83 of a resistor and capacitor. Its collector electrode is connected by means of a conductor 64 to one end of the horizontal yoke made up of coils 84 and 86. Connected in series with the horizontal yoke and the negative termianl 35' of a source of direct current is a winding 87. Connected across the yoke coils 84–86 and winding 87 is a charging capacitor 39'. Adjacent the winding 87 is a pick up winding 88 that is connected between ground potential and the phase detector 30. A resistor 89 is connected across the winding 88.

As indicated above, in the illustrated embodiment sawtooth current through the yoke windings is used as a phase reference and is applied to the phase detector 30 by means of the winding 88. The phase detector also has the synchronizing signals applied thereto from the sync separator 18. Therefore, the superposition of the signals applied to the phase detector 30 appear as shown by the waveform adjacent the box 30 as the sawtooth current wave 91 and the sync pulse 92 shown in dotted lines. The phase detector 30 and integrating circuit 40 are circuits which are known in the art and operate to provide pulses for properly synchronizing the operation of the blocking oscillator transistor 51. One such known arrangement is described in United States Patent No. 2,344,810, G. L. Fredendall et al., March 24, 1944.

In operation the blocking oscillator transistor 51 produces rectangular output pulses in the output windings 61 of the transformer 50 at a repetition rate determined by the output of the integrating circuit 40 applied on input conductor 22'. Such blocking oscillator output pulse is represented by the waveform 67 of FIGURE 4. To illustrate the advantageous effect of the inductor 63 the solid line waveforms in FIGURE 4 represent the various currents and voltages of the transistor 52 without the inductor 63 being connected in the circuit. The dotted line waveforms of FIGURE 4 illustrate the respective currents and voltages with the inductor connected as shown.

Accordingly, when the leading edge of the square wave 67 is applied at time $t_1$ without the inductor present, the base current flow is represented by the waveform 68. Since the transistor 52 is operating in saturated condition just prior to the application of the pulse 67, it continues to act as a closed switch for the time intervals $t_1$ to $t_2$. During this time interval, excess stored carriers are removed from the transistor 52. Accordingly, the collector current represented by the waveform 69 continues to increase as before.

The flyback pulse does not start to develop until the collector current 69 starts to cut off. However, once cut-off begins, it must be completed as quickly as possible as pointed out hereinabove. The cut-off time is approximately inversely proportional to the reverse voltage applied to the base of the transistor 52 during this time interval. It can be seen that the base voltage represented by the dotted line 71, with inductor 63 connected as shown, is substantially increased as compared to waveform 67 during the time interval $t_2$ to $t_3$ which is the critical cut-off time intreval.

The additional voltage on the base electrode of the transistor 52 is produced by the superposition of the voltage due to the square wave 67 and the voltage developed across the inductor 63. Such developed voltage is represented in FIGURE 4 by the waveform 72.

It is clear from a comparison of the solid and dotted lines of FIGURE 4 that the addition of the inductor 63 achieves much faster cut-off time for the transistor 52. Also, this increased reverse base voltage is no longer present when the flyback pulse illustrated in FIGURE 4 by waveform 70 is produced. The flyback pulse 70 is developed primarily between the time interval $t_3$ and $t_4$. The possibility of reverse base-emitter breakdown and the above-mentioned channeling of collector-emitter current is thereby substantially eliminated.

In the automatic phase controlled system shown in FIGURE 3, the phase reference is taken from the yoke sawtooth current 91. Therefore if any delay in the flyback operation is added by the introduction of the inductor 63 in the base circuit of the transistor 52, such delay will be compensated for by a shifting in phase of the output of the blocking oscillator. Therefore, its output pulses may actually precede the incoming horizontal synchronizing pulses. Such phase relationship is shown in FIGURE 4 by the waveform 80 may thus occur after the leading edge of the waveform 67.

In the embodiment of FIGURE 3 the use of the inductor 63 also helps to improve the oscillation of the blocking oscillator transistor 51. This oscillator operates between on and off conditions with the greatest dissipation in this transistor occurring during the turn on transition. The faster the transistor 51 is turned on the lower will be the dissipation therein. If the transistor 51 is heavily loaded, the turn on time is increased by a substantial amount. The presence of the inductor 63 momentarily decouples loading on transistor 51 due to transistor 52 and gives a much faster oscillator rise time.

It is apparent that the utilization of the circuits set forth herein will substantially improve the operation of the transistors by reducing the power dissipated in the transistor and providing a more efficient operation and longer life.

What is claimed is:

1. In a horizontal deflection circuit for a transistorized television receiver having an output transistor responsive to an applied voltage waveform in excess of a predetermined cut-off amplitude for passing from a conductive to a non-conductive state and adapted to be connected to the horizontal electromagnetic deflection means of the kinescope in the television receiver for developing substantially sawtooth shaped output currents upon being rendered alternately conductive and nonconductive by shaped pulses applied to said output transistor, the pulse shaping being such that the leading edge of each of said shaped pulses has an amplitude substantially higher than the cut-off voltage for said output transistor and the trailing edge amplitude of each of said shaped pulses is higher than said cut-off voltage and substantially lower than said leading edge amplitude, means for generating said shaped pulses comprising:

- a blocking oscillator transistor;
- a blocking oscillator transformer connected in circuit with said blocking oscillator transistor and having a plurality of windings; and
- bilaterally conductive impedance means arranged in series with one of said windings of said blocking oscillator transformer to effect said pulse shaping.

2. In a horizontal deflection circuit for a transistorized television receiver having an output transistor responsive to an applied voltage waveform in excess of a predetermined cut-off amplitude for passing from a conductive to a non-conductive state and adapted to be connected to the horizontal electromagnetic deflection means of the kinescope in the television receiver for developing substantially sawtooth shaped output currents upon being rendered alternately conductive and nonconductive by shaped pulses applied to said output transistor, the pulse shaping being such that the leading edge of each of said shaped pulses has an amplitude substantially higher than the cut-off voltage for said output transistor and the trailing edge amplitude of each of said shaped pulses is higher than said cut-off voltage and substantially lower than said leading edge amplitude, means for generating said shaped pulses comprising:

a blocking oscillator transistor;

a blocking oscillator transformer connected in circuit with said blocking oscillator transistor and having a plurality of windings; and a parallel combination of a resistor and capacitor, said combination being arranged in series with one of said windings of said blocking oscillator transformer to effect said pulse shaping.

3. In a horizontal deflection circuit for a transistorized television receiver having an output transistor responsive to an applied voltage waveform in excess of a predetermined cut-off amplitude for passing from a conductive to a non-conductive state and adapted to be connected to the horizontal electromagnetic deflection means of the kinescope in the television receiver for developing substantially sawtooth shaped output currents upon being rendered alternately conductive and nonconductive by shaped pulses applied to said output transistor, the pulse shaping being such that the leading edge of each of said shaped pulses has an amplitude substantially higher than the cut-off voltage for said output transistor and the trailing edge amplitude of each of said shaped pulses is higher than said cut-off voltage and substantially lower than said leading edge amplitude, means for generating said shaped pulses comprising:

a blocking oscillator transistor;

a blocking oscillator transformer connected in circuit with said blocking oscillator transistor and having a plurality of windings; and an inductor arranged in series with one of said windings of said blocking oscillator transformer to effect said pulse shaping.

4. In a deflection circuit for a transistorized television receiver, the deflection circuit having an output transistor responsive to an applied potential waveform in excess of a predetermined cut-off amplitude for passing from a conductive to a non-conductive state and adapted to be coupled to an electromagnetic deflection winding for developing substantially sawtooth shaped output currents upon being rendered alternately conductive and nonconductive in response to shaped electrical pulses applied to said output transistor, generator means coupled to said output transistor for supplying said shaped pulses to render said output transistor alternately conductive and nonconductive, said generator means comprising at least one transistor having input and output terminals and a parallel circuit combination of bilaterally conductive resistance and capacitance means, said parallel combination being coupled in circuit with said output terminals for shaping pulses prior to the application thereof to said output transistor, said parallel combination shaping each said pulse such that the leading edge thereof has an amplitude substantially in excess of the cut-off potential of said output transistor and the trailing edge thereof has an amplitude exceeding said cut-off potential but substantially less than the amplitude of said leading edge.

5. In a deflection circuit for a transistorized television receiver, the deflection circuit having an output transistor responsive to an applied potential waveform in excess of a predetermined cut-off amplitude for passing from a conductive to a non-conductive state and adapted to be coupled to an electromagnetic deflection winding for developing substantially sawtooth shaped output currents upon being rendered alternately conductive and nonconductive in response to shaped electrical pulses applied to said output transistor, generator means coupled to said output transistor for supplying said shaped pulses to render said output transistor alternately conductive and nonconductive, said generator means comprising a transistor blocking oscillator, an output circuit coupled to said blocking oscillator, said output circuit including a parallel circuit combination of bilaterally conductive resistance and capacitance means for shaping pulses produced by said blocking oscillator prior to the application thereof to said output transistor, said resistance and capacitance means being selected to shape each pulse such that the leading edge thereof has an amplitude substantially in excess of the cut-off potential of said output transistor and the trailing edge thereof has an ampltiude exceeding said cut-off potential but substantially less than the amplitude of said leading edge.

References Cited by the Examiner

UNITED STATES PATENTS

| | | | |
|---|---|---|---|
| 2,962,626 | 11/1960 | Berg et al. | 315—27 |
| 3,002,110 | 9/1961 | Hamilton | 307—88.5 |
| 3,133,208 | 5/1964 | Lentz | 331—112 X |
| 3,156,876 | 11/1964 | Fischman et al. | 331—112 |
| 3,205,401 | 9/1965 | Fyler et al. | 315—27 |

ARTHUR GAUSS, *Primary Examiner.*

DAVID G. REDINBAUGH, *Examiner.*

J. E. BECK, J. ZAZWORSKY, *Assistant Examiners.*

UNITED STATES PATENT OFFICE
CERTIFICATE OF CORRECTION

Patent No. 3,302,033 January 31, 1967

Hunter C. Goodrich

It is hereby certified that error appears in the above numbered patent requiring correction and that the said Letters Patent should read as corrected below.

Column 6, line 20, after "waveform 80" insert -- . It can be seen that the synchronizing pulse in the waveform 80 --.

Signed and sealed this 6th day of February 1968.

(SEAL)
Attest:

Edward M. Fletcher, Jr.
Attesting Officer

EDWARD J. BRENNER
Commissioner of Patents